United States Patent
Luo et al.

(10) Patent No.: US 11,556,784 B2
(45) Date of Patent: Jan. 17, 2023

(54) MULTI-TASK FUSION NEURAL NETWORK ARCHITECTURE

(71) Applicant: Samsung Electronics Co., Ltd., Suwon-si (KR)

(72) Inventors: Chenchi Luo, Plano, TX (US); Yingmao Li, Allen, TX (US); Youngjun Yoo, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 530 days.

(21) Appl. No.: 16/693,112

(22) Filed: Nov. 22, 2019

(65) Prior Publication Data

US 2021/0158142 A1    May 27, 2021

(51) Int. Cl.
*G06N 3/08*    (2006.01)
*G06N 3/04*    (2006.01)

(52) U.S. Cl.
CPC .............. *G06N 3/08* (2013.01); *G06N 3/04* (2013.01)

(58) Field of Classification Search
CPC .......... G06N 3/08; G06N 3/04; G06N 3/0454; G06K 9/629; G06K 9/6267; G06V 10/40; G06T 7/571; G06T 2207/20084; G06T 2207/2081; G06T 2207/20221
See application file for complete search history.

(56) References Cited

U.S. PATENT DOCUMENTS

| | | | |
|---|---|---|---|
| 10,140,544 B1 * | 11/2018 | Zhao | G06V 10/454 |
| 10,380,753 B1 | 8/2019 | Csordás et al. | |
| 10,453,220 B1 | 10/2019 | Mihal et al. | |
| 10,643,107 B1 * | 5/2020 | Yoo | G06V 10/82 |
| 10,645,368 B1 | 5/2020 | Yu | |

(Continued)

FOREIGN PATENT DOCUMENTS

| | | |
|---|---|---|
| CN | 108681753 A | 10/2018 |
| CN | 110084124 A | 8/2019 |

(Continued)

OTHER PUBLICATIONS

International Search Report and Written Opinion of the International Searching Authority in connection with International Patent Application No. PCT/KR2020/014673 dated Jan. 26, 2021, 9 pages.

(Continued)

*Primary Examiner* — Yogeshkumar Patel

(57) ABSTRACT

A method includes identifying, by at least one processor, multiple features of input data using a common feature extractor. The method also includes processing, by the at least one processor, at least some identified features using each of multiple pre-processing branches. Each pre-processing branch includes a first set of neural network layers and generates initial outputs associated with a different one of multiple data processing tasks. The method further includes combining, by the at least one processor, at least two initial outputs from at least two pre-processing branches to produce combined initial outputs. In addition, the method includes processing, by the at least one processor, at least some initial outputs or at least some combined initial outputs using each of multiple post-processing branches. Each post-processing branch includes a second set of neural network layers and generates final outputs associated with a different one of the multiple data processing tasks.

20 Claims, 5 Drawing Sheets

(56) References Cited

U.S. PATENT DOCUMENTS

| | | |
|---|---|---|
| 2010/0246940 A1 | 9/2010 | Lin |
| 2017/0168586 A1 | 6/2017 | Sinha et al. |
| 2018/0130177 A1 | 5/2018 | Wang et al. |
| 2018/0139458 A1 | 5/2018 | Wang et al. |
| 2019/0057301 A1 | 2/2019 | Pantazi et al. |
| 2019/0130590 A1 | 5/2019 | Volochniuk et al. |
| 2020/0145642 A1* | 5/2020 | Yu ........................ H04N 13/271 |

FOREIGN PATENT DOCUMENTS

| | | |
|---|---|---|
| CN | 110135501 A | 8/2019 |
| CN | 110476185 A | 11/2019 |
| KR | 10-2046134 B1 | 11/2019 |
| RU | 2698402 C1 | 8/2019 |
| WO | 2019070299 A1 | 4/2019 |

OTHER PUBLICATIONS

Lee et al., "Making Sense of Vision and Touch: Learning Multimodal Representations for Contact-Rich Tasks," Department of Computer Science, Stanford University, arXiv:1907.13098v1, Jul. 2019, 14 pages.

Supplementary European Search Report dated Jul. 19, 2022 in connection with European Patent Application No. 20891348.3, 7 pages.

Li et al., "Heterogeneous Multitask Learning for Human Pose Estimation with Deep Convolutional Neural Network," International Journal of Computer Vision, vol. 113, Sep. 2014, 18 pages.

Ruder, "An Overview Of Multitask Learning In Deep Neural Networks," Machine Learning, Jun. 2017, 14 pages.

Standley et al., "Which Tasks Should Be Learned Together in Multi-Task Learning?" Computer Vision and Pattern Recognition, May 2019, 10 pages.

Kuga et al., "Multi-Task Learning Using Multi-Modal Encoder-Decoder Networks with Shared Skip Connections," IEEE International Conference on Computer Vision Workshops, Oct. 2017, 9 pages.

* cited by examiner

MULTI-TASK FUSION NEURAL NETWORK ARCHITECTURE

TECHNICAL FIELD

This disclosure relates generally to machine learning systems. More specifically, this disclosure relates to a multi-task fusion neural network architecture, which may be used in image processing applications or other applications.

BACKGROUND

Many mobile electronic devices, such as smartphones and tablet computers, include cameras that can be used to capture still and video images. While convenient, cameras on mobile electronic devices typically suffer from a number of shortcomings that reduce their image quality. Various machine learning algorithms can be used in a number of image processing-related applications to improve the quality of images captured using mobile electronic devices or other devices. For example, different convolutional neural networks may be trained and then used to perform different image processing tasks to improve the quality of captured images.

SUMMARY

This disclosure provides a multi-task fusion neural network architecture.

In a first embodiment, a method includes identifying, by at least one processor, multiple features of input data using a common feature extractor. The method also includes processing, by the at least one processor, at least some of the identified features of the input data using each of multiple pre-processing branches. Each pre-processing branch includes a first set of neural network layers and generates initial outputs associated with a different one of multiple data processing tasks. The method further includes combining, by the at least one processor, at least two of the initial outputs from at least two of the pre-processing branches to produce combined initial outputs. In addition, the method includes processing, by the at least one processor, at least some of the initial outputs or at least some of the combined initial outputs using each of multiple post-processing branches. Each post-processing branch includes a second set of neural network layers and generates final outputs associated with a different one of the multiple data processing tasks.

In a second embodiment, an electronic device includes at least one memory and at least one processor operatively coupled to the at least one memory. The at least one processor is configured to identify multiple features of input data using a common feature extractor. The at least one processor is also configured to process at least some of the identified features of the input data using each of multiple pre-processing branches. Each pre-processing branch includes a first set of neural network layers and is configured to generate initial outputs associated with a different one of multiple data processing tasks. The at least one processor is further configured to combine at least two of the initial outputs from at least two of the pre-processing branches to produce combined initial outputs. In addition, the at least one processor is configured to process at least some of the initial outputs or at least some of the combined initial outputs using each of multiple post-processing branches. Each post-processing branch includes a second set of neural network layers and is configured to generate final outputs associated with a different one of the multiple data processing tasks.

In a third embodiment, a non-transitory machine-readable medium contains instructions that when executed cause at least one processor of an electronic device to identify multiple features of input data using a common feature extractor. The medium also contains instructions that when executed cause the at least one processor to process at least some of the identified features of the input data using each of multiple pre-processing branches. Each pre-processing branch includes a first set of neural network layers and is configured to generate initial outputs associated with a different one of multiple data processing tasks. The medium further contains instructions that when executed cause the at least one processor to combine at least two of the initial outputs from at least two of the pre-processing branches to produce combined initial outputs. In addition, the medium contains instructions that when executed cause the at least one processor to process at least some of the initial outputs or at least some of the combined initial outputs using each of multiple post-processing branches. Each post-processing branch includes a second set of neural network layers and is configured to generate final outputs associated with a different one of the multiple data processing tasks.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member,"

"apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
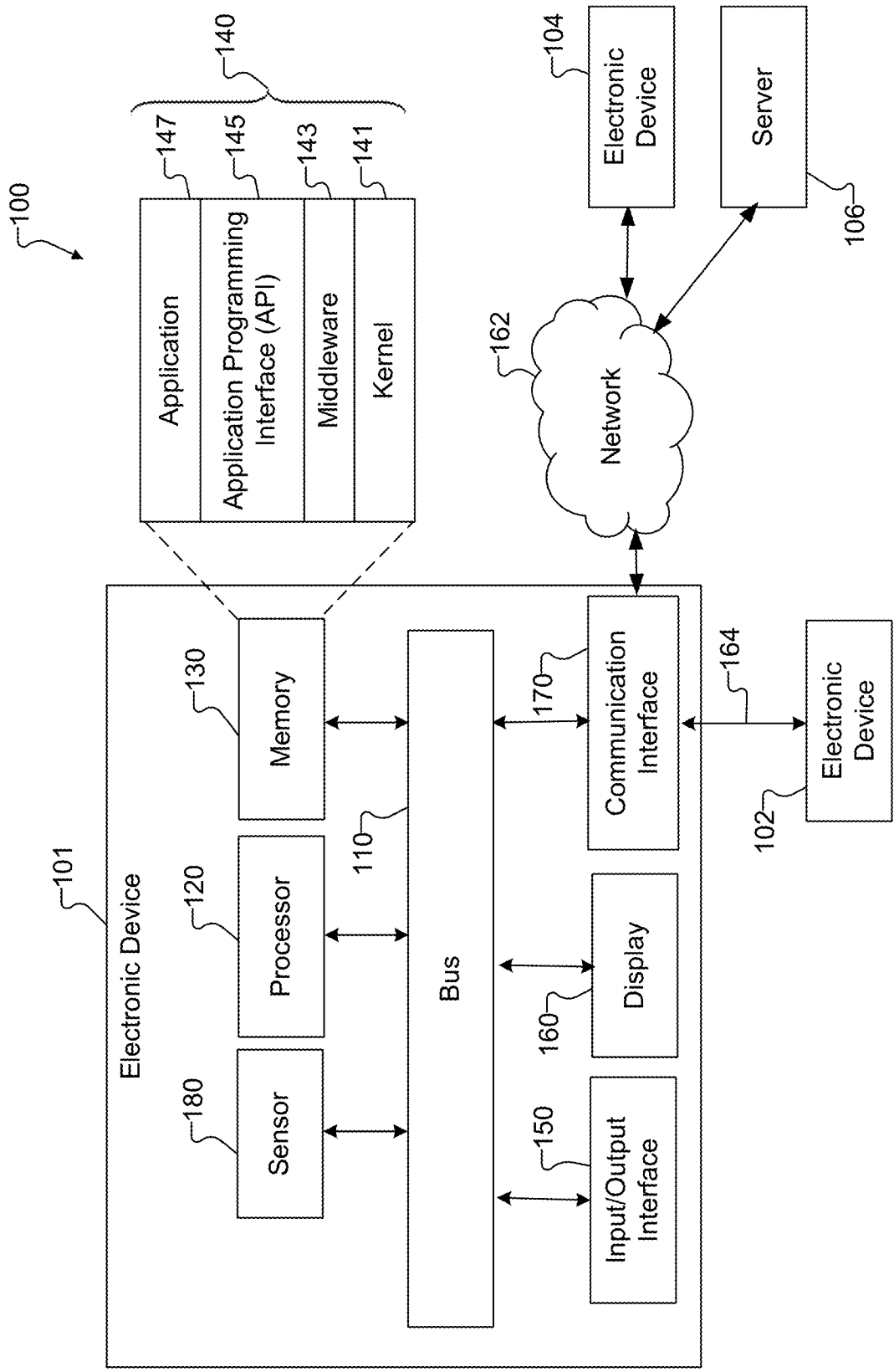
FIG. 1 illustrates an example network configuration including an electronic device in accordance with this disclosure.

FIGS. 1 through 6, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As noted above, many mobile electronic devices, such as smartphones and tablet computers, include cameras that can be used to capture still and video images. However, cameras on mobile electronic devices typically suffer from a number of shortcomings. Various machine learning algorithms can be used in a number of image processing-related applications to improve the quality of images captured using mobile electronic devices or other devices. For example, different convolutional neural networks may be trained and then used to perform different image processing tasks to improve the quality of captured images. Each convolutional neural network is typically trained to perform a specific task. For instance, in the image processing realm, different convolutional neural networks can be trained to recognize types of scenes or objects in the scenes, identify depths of objects in scenes, segment images based on objects in scenes, or generate high dynamic range (HDR) images, Bokeh images, or super-resolution images.

As it turns out, the architectures of convolutional neural networks that perform these or other types of tasks can often have a large degree of similarity. For instance, these types of convolutional neural networks routinely include feature extractors that are used to identify different features in images, where the extracted features are then further processed to perform desired tasks. The feature extractors in different convolutional neural networks are typically derived from common designs, such as InceptionNet, ResidualNet, or UNet designs. The feature extractors used in convolutional neural networks for different tasks typically have different weights because they are trained using different training data. Other than these differences, only small portions of these convolutional neural networks tend to be task-specific, meaning those small portions of the convolutional neural networks vary based on the tasks being performed.

This disclosure provides a multi-task fusion neural network architecture in which convolutional neural network layers trained to perform different tasks share the same front-end feature extractor. The feature extractor uses a single set of weights for all of the different tasks to be performed. The feature extractor can be trained as desired to generate these weights, such as by using computer-generated (CG) training images that are produced using a unified synthetic data engine. The ability to use a single feature extractor for multiple tasks can result in an overall architecture having a significantly reduced complexity compared to using multiple individual convolutional neural networks with their own feature extractors for different tasks.

Moreover, the multi-task fusion neural network architecture described in this disclosure allows multiple tasks to be performed concurrently or in parallel. In the image processing realm, for instance, this may allow disparity or depth map generation, segmentation mask generation, Bokeh image generation, and HDR image generation tasks to occur concurrently rather than serially when processing and outputting one or more images. Of course, any other or additional combinations of image processing tasks or other data processing tasks may be performed here. The ability to perform tasks concurrently can significantly speed up the tasks performed by the multi-task fusion neural network architecture.

In addition, the multi-task fusion neural network architecture supports a back-end fusion layer that can combine initial results produced by multiple convolutional neural network layers performing different tasks. This allows the multi-task fusion neural network architecture to fuse outputs from different task-specific branches of the neural network architecture to further complement individual tasks. As recognized in this disclosure, different tasks are often highly coupled with or otherwise related to one another. For example, generating a depth map (which identifies the depth of each pixel in an image of a scene) can provide strong clues that may be used when generating a semantic segmentation mask (which identifies different pixels or boundaries in an image related to a specific object in a scene) and vice versa. Convolutional neural networks that separately generate depth maps and segmentation masks cannot take advantage of this kind of task inter-relationship knowledge. The multi-task fusion neural network architecture of this disclosure can take advantage of this kind of knowledge and support information fusion. This helps to increase the quality of the results obtained by the individual tasks being performed in the multi-task fusion neural network architecture, such as by increasing the accuracy of depth maps and segmentation masks.

Additional details regarding the multi-task fusion neural network architecture are provided below. It should be noted here that while the multi-task fusion neural network architecture is often described as being used to perform specific image processing tasks, the multi-task fusion neural network architecture provided in this disclosure is not limited to use with these specific image processing tasks or to use with image processing in general. Rather, the multi-task fusion neural network architecture may be used in any suitable system to perform operations in which a common front-end feature extractor and a common back-end fusion layer support at least two data processing tasks being performed.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component.

The bus 110 includes a circuit for connecting the components 120-180 with one another and for transferring communications (such as control messages and/or data) between the components. The processor 120 includes one or more of a central processing unit (CPU), a graphics processor unit (GPU), an application processor (AP), or a communication processor (CP). The processor 120 is able to perform control on at least one of the other components of the electronic device 101 and/or perform an operation or data processing relating to communication. In some embodiments, the processor 120 processes data using a multi-task fusion neural network architecture to perform multiple tasks using the data as described below. In particular embodiments, the processor 120 processes image data using the multi-task fusion neural network architecture to perform multiple tasks using the image data and generate images of scenes.

The memory 130 can include a volatile and/or nonvolatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications for data processing using a multi-task fusion neural network architecture as discussed below. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some embodiments, the server 106 processes data using a multi-task fusion neural network architecture to perform multiple tasks using the data as described below. In particular embodiments, the server 106 processes image data using the multi-task fusion neural network architecture to perform multiple tasks using the image data and generate images of scenes.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
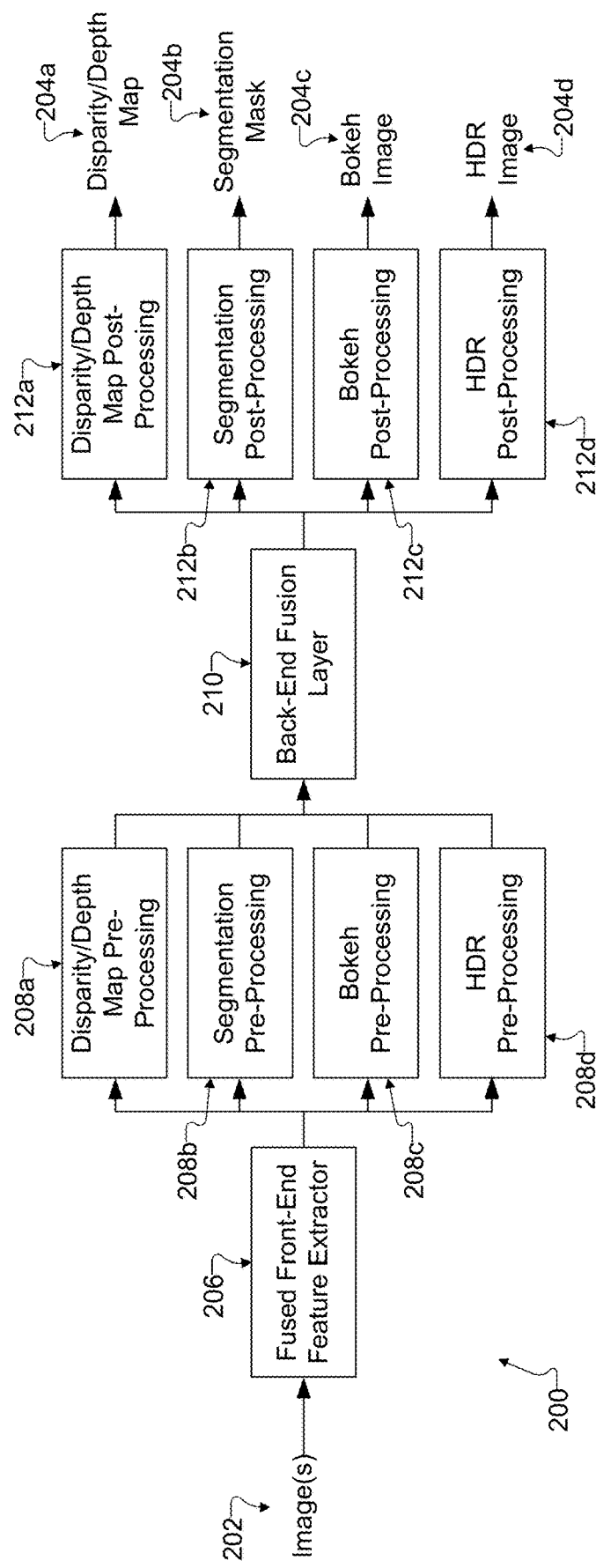
FIG. 2 illustrates an example multi-task fusion neural network architecture in accordance with this disclosure.

FIG. 2 illustrates an example multi-task fusion neural network architecture 200 in accordance with this disclosure. For ease of explanation, the multi-task fusion neural network architecture 200 of FIG. 2 is described as being implemented using the electronic device 101 or the server 106 in the network configuration 100 of FIG. 1. However, the multi-task fusion neural network architecture 200 of FIG. 2 may be used by any other suitable device(s) and in any other suitable system(s). Also, the multi-task fusion neural network architecture 200 of FIG. 2 is described as being used to perform specific image processing-related tasks. However, the multi-task fusion neural network architecture 200 of FIG. 2 may be used to perform any other suitable tasks, including non-image processing tasks.

As shown in FIG. 2, the multi-task fusion neural network architecture 200 is configured to receive and process input data, which in this example includes one or more images 202. The one or more images 202 may be received from any suitable source(s), such as from one or more cameras (one or more sensors 180) of the electronic device 101. The multi-task fusion neural network architecture 200 generally operates here to process the image(s) 202 and generate various outputs. In this example, the outputs include at least one disparity/depth map 204*a*, at least one segmentation mask 204*b*, at least one Bokeh image 204*c*, and at least one HDR image 204*d*. Each disparity/depth map 204*a* generally represents apparent pixel differences or motion between a pair of images 202 (for disparity) or the apparent depth of pixels in one or more images 202 (for depth). In the absence of motion, the disparity between the same point in two different images 202 is inversely proportional to depth, so a disparity map may be used when computing a depth map (or vice versa). Each segmentation mask 204*b* generally represents the pixels or boundaries in an image 202 related to a specific object in a scene. Each Bokeh image 204*c* generally represents an image in which the background of the image has been digitally blurred. Each HDR image 204*d* generally represents an image generated by combining multiple input images 202, where the dynamic range of the combined image is greater than the individual dynamic ranges of the individual input images 202.

The multi-task fusion neural network architecture 200 includes a fused front-end feature extractor 206, which generally operates to process the image(s) 202 and extract various features from each image 202. The identified features in an image 202 may represent one or more characteristics of the image 202. The extracted features may include characteristics such as specific shapes, edges, corners, blobs, junctions, ridges, curves, and textures. The fused front-end feature extractor 206 may be implemented in a number of ways. For example, various feature extractors are known in the art, and additional feature extractors are sure to be developed in the future. Some implementations that may be used as the fused front-end feature extractor 206 here include AlexNet, VGG, InceptionNet, ResidualNet, UNet, MobileNet, DenseNet, ShuffleNet, and SqueezeNet. However, the multi-task fusion neural network architecture 200 is not limited to use with any specific type or types of front-end feature extractors.

Figure 3:
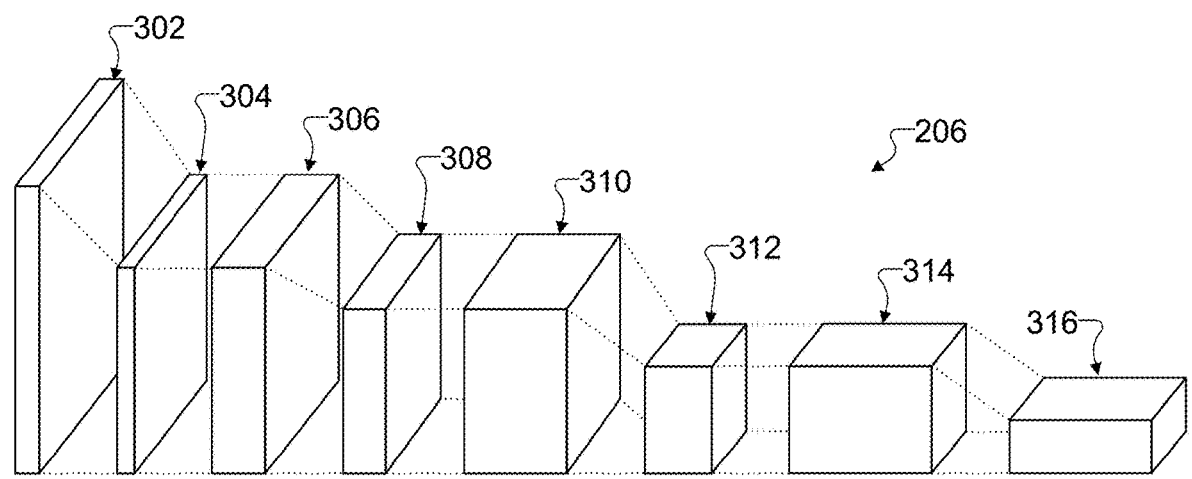
FIG. 3 illustrates an example front-end feature extractor in a multi-task fusion neural network architecture in accordance with this disclosure.

In some embodiments, the fused front-end feature extractor 206 includes various neural network operational layers (such as convolutional and pooling layers) that implement the feature extraction functionality. A convolutional layer generally represents a layer of convolutional neurons, which apply a convolution operation that emulates the response of individual neurons to visual stimuli. Each neuron typically applies some function to its input values (often by weighting different input values differently) to generate output values. A convolutional layer may be associated with an activation function, which can apply a specific function or operation to the output values from the neurons to produce final outputs of the convolutional layer. A pooling layer generally represents a layer that combines the outputs from one convolutional layer into inputs for the next layer. For instance, a pooling layer that uses maximum pooling identifies maximum outputs from clusters in the prior layer for input to the next layer, and a pooling layer that uses average pooling identifies averages of the outputs from clusters in the prior layer for input to the next layer. One example implementation of the fused front-end feature extractor 206 is shown in FIG. 3, which is described below.

As noted above, the same fused front-end feature extractor 206 is used with multiple image processing tasks or other data processing tasks in the multi-task fusion neural network architecture 200. Because of this, the same weights in the fused front-end feature extractor 206 are used with all of the processing tasks to be performed in the multi-task fusion neural network architecture 200. In order to train the fused front-end feature extractor 206 to use these weights, suitable training images or other training data can be provided to the fused front-end feature extractor 206 during training. In some embodiments, a unified synthetic data engine or other source(s) can be used to provide computer-generated training images or other training data having known features to the fused front-end feature extractor 206. This can help to train the fused front-end feature extractor 206 to identify a number of various features in images or other input data. Note, however, that the fused front-end feature extractor 206 may be trained in any other suitable manner.

The extracted features identified by the fused front-end feature extractor 206 are provided to multiple pre-processing branches 208a-208d, which can process the extracted features in various ways to support various tasks being performed in the multi-task fusion neural network architecture 200. In this example, there are four pre-processing branches 208a-209d that perform different operations to support four different image processing tasks. More specifically, the pre-processing branch 208a is used to perform operations to support the generation of disparity/depth maps, the pre-processing branch 208b is used to perform operations to support the generation of segmentation masks, the pre-processing branch 208c is used to perform operations to support the generation of Bokeh images, and the pre-processing branch 208d is used to perform operations to support the generation of HDR images. Note that while four pre-processing branches 208a-208d are shown here, the multi-task fusion neural network architecture 200 may include two or more pre-processing branches in other embodiments. Also note that while related to image processing tasks, the pre-processing branches 208a-208d may be used to perform other tasks.

The pre-processing branches 208a-208d represent different collections or sets of convolutional neural network layers or other machine learning layers that process extracted features from the fused front-end feature extractor 206 and generate coarse outputs or other initial task outputs related to their respective task-specific functions. For example, the pre-processing branch 208a may generate and output initial estimates of a disparity or depth map for one or more images 202, and the pre-processing branch 208b may generate and output initial estimates of a segmentation mask for an image 202. Also, the pre-processing branch 208c may generate and output an initial image having a blurred background, and the pre-processing branch 208d may generate and output an initial image having a higher dynamic range. The convolutional neural network layers forming the pre-processing branches 208a-208d are typically trained to process extracted features differently and generate different outputs for their respective tasks using suitable training data for those tasks.

The initial outputs from the pre-processing branches 208a-208d are provided to a back-end fusion layer 210, which fuses or combines the initial outputs from at least some of the pre-processing branches 208a-208d together for further joint processing. For example, the back-end fusion layer 210 may concatenate the initial outputs from different ones of the pre-processing branches 208a-208d together and output the concatenated outputs for further processing. Depending on the implementation, the back-end fusion layer 210 may concatenate or otherwise combine the initial outputs from any suitable combination(s) of the pre-processing branches 208a-208d.

As one example, generating a depth map can provide strong clues that may be used when generating a semantic segmentation mask (and vice versa). Thus, the back-end fusion layer 210 may concatenate or otherwise combine the initial outputs from the pre-processing branches 208a and 208b for joint processing. As another example, producing effective Bokeh images 204c may depend on effectively identifying background portions of images 202 (which can depend on detected depths), so the back-end fusion layer 210 may concatenate or otherwise combine the initial outputs from the pre-processing branches 208b and 208c for joint processing. As yet another example, producing HDR images 204d may depend on effectively identifying portions of images 202 in which motion is occurring (so that other portions of the images 202 may be blended while the motion portion of one image may be used without blending). Here, the back-end fusion layer 210 may concatenate or otherwise combine the initial outputs from the pre-processing branches 208a and 208d for joint processing.

Figure 4:
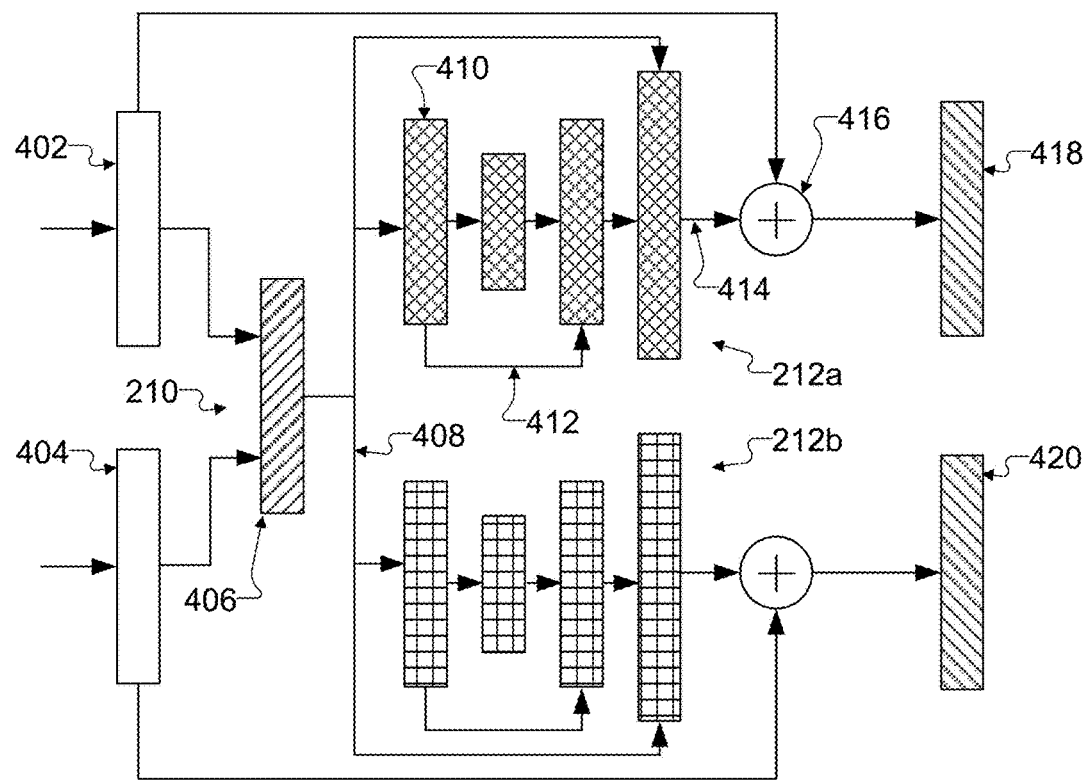
FIG. 4 illustrates an example back-end fusion layer in a multi-task fusion neural network architecture in accordance with this disclosure.

Note that these specific combinations of initial outputs from the pre-processing branches 208a-208d are examples only. In general, the initial outputs from the pre-processing branches 208a-208d may be combined in any suitable combination or combinations (each combination involving outputs from two or more of the pre-processing branches 208a-208d) in order to allow the information from at least one pre-processing branch to be used in subsequent processing along with the information from at least one other pre-processing branch. One example implementation of the back-end fusion layer 210 is shown in FIG. 4, which is described below.

Various initial outputs and combined initial outputs from the back-end fusion layer 210 are provided to multiple post-processing branches 212a-212d. The post-processing branches 212a-212d process the initial outputs and combined initial outputs to complete the various tasks being performed in the multi-task fusion neural network architecture 200 and generate the various outputs 204a-204d. In this example, there are four post-processing branches 212a-212d that perform different operations to generate the four different outputs 204a-204d. More specifically, the post-processing branch 212a performs operations to generate the disparity/depth maps 204a, the post-processing branch 212b performs operations to generate the segmentation masks 204*b*, the post-processing branch 212*c* performs operations to generate the Bokeh images 204*c*, and the post-processing branch 212*d* performs operations to generate the HDR images 204*d*. Again, note that while four post-processing branches 212*a*-212*d* are shown here, the multi-task fusion neural network architecture 200 may include two or more post-processing branches in other embodiments. Also note that while related to image processing tasks, the post-processing branches 212*a*-212*d* may be used to perform other tasks.

The post-processing branches 212*a*-212*d* represent convolutional neural network layers or other machine learning layers that process initial outputs and/or combined initial outputs to produce the final outputs 204*a*-204*d* related to their respective task-specific functions. The convolutional neural network layers forming the post-processing branches 212*a*-212*d* are typically trained to process initial outputs and/or combined initial outputs and generate different final outputs for their respective tasks using suitable training data for those tasks.

Through the use of the back-end fusion layer 210 here, a post-processing branch 212*a*-212*d* is able to receive the initial outputs from its own corresponding pre-processing branch 208*a*-208*d* and the initial outputs from at least one other pre-processing branch 208*a*-208*d*. Thus, for example, the post-processing branch 212*a* and the post-processing branch 212*b* may each receive concatenated or otherwise combined initial outputs from the pre-processing branches 208*a* and 208*b*. As another example, the post-processing branch 212*c* may receive concatenated or otherwise combined initial outputs from the pre-processing branches 208*a* and 208*c*. As yet another example, the post-processing branch 212*d* may receive concatenated or otherwise combined initial outputs from the pre-processing branches 208*b* and 208*d*. Again, the ability to fuse initial outputs from different pre-processing branches 208*a*-208*d* for use by one or more post-processing branches 212*a*-212*d* can vary in a number of ways, and the above examples are merely illustrative of how this can be done in this specific example.

It should be noted here that each individual post-processing branch 212*a*-212*d* may receive the initial outputs from only one pre-processing branch 208*a*-208*d* or the combined initial outputs from multiple pre-processing branches 208*a*-208*d*. There is no requirement that every single post-processing branch 212*a*-212*d* receive fused initial outputs from multiple pre-processing branches 208*a*-208*d*, although that may be the case in some implementations. If a post-processing branch 212*a*-212*d* receives the initial outputs from only one pre-processing branch 208*a*-208*d*, the initial outputs may be received by the post-processing branch 212*a*-212*d* directly from the pre-processing branch 208*a*-208*d* or indirectly, such as via the back-end fusion layer 210. Thus, as can be seen here, the multi-task fusion neural network architecture 200 is highly customizable and can be configured in various ways.

In a typical convolutional neural network, the associated feature extractor typically accounts for a large percentage of the complexity of the convolutional neural network. For example, in some cases, a feature extractor may account for approximately 80% of the overall complexity for a convolutional neural network, and the remaining operations of the convolutional neural network may account for approximately 20% of the overall complexity of the convolutional neural network. Using separate convolutional neural networks to perform different tasks typically results in a super-linear complexity increase with respect to the number of tasks performed (and therefore the number of convolutional neural networks used). Moreover, the convolutional neural networks are decoupled, and there is no ability for one convolutional neural network to use initial outputs from any other convolutional neural networks. In addition, the convolutional neural networks are often trained using training data collected from completely different sources, with large variations in the specification and quality of the training data. It is therefore not possible to unify the weights used in the feature extractors of the convolutional neural networks.

The multi-task fusion neural network architecture 200 overcomes these types of issues. By using a common fused front-end feature extractor 206 for multiple tasks, the multi-task fusion neural network architecture 200 can achieve significant reductions in complexity. In some instances, for example, the complexity can be reduced by a factor of about 1.42 for a three-task multi-task fusion neural network architecture 200, a factor of about 1.60 for a four-task multi-task fusion neural network architecture 200, and a factor of about 1.72 for a five-task multi-task fusion neural network architecture 200 (although these values are for illustration only and relate to specific implementations with specific tasks). Moreover, the use of the back-end fusion layer 210 helps to couple or link the operations of the convolutional neural network layers for different tasks, allowing convolutional neural network layers of certain tasks to use initial outputs from convolutional neural network layers of other tasks. This can result in improved quality or operation of the individual tasks. In addition, the common fused front-end feature extractor 206 can be trained using a common set of training data for all tasks, which can be well-defined and which helps to unify the feature extractor weights for all tasks.

Although FIG. 2 illustrates one example of a multi-task fusion neural network architecture 200, various changes may be made to FIG. 2. For example, the multi-task fusion neural network architecture 200 may include two or more pre-processing branches and two or more post-processing branches. Also, the tasks performed using the pre-processing branches and the post-processing branches may or may not involve image processing.

FIG. 3 illustrates an example fused front-end feature extractor 206 in a multi-task fusion neural network architecture 200 in accordance with this disclosure. As described above, the fused front-end feature extractor 206 is used to identify/extract features from input images 202 or other input data for further processing by the various tasks of the multi-task fusion neural network architecture 200. Note that the fused front-end feature extractor 206 shown here may be used to process any suitable input data and is not limited to processing image data.

As shown in FIG. 3, the fused front-end feature extractor 206 includes various neural network operational layers 302-316 that implement the feature extraction functionality. Here, the feature extraction functionality is provided by processing input data to produce feature maps that identify the features in the input data. This is accomplished by gradually reducing the spatial resolution of the input data being processed while gradually increasing the depth of the resulting feature map being generated using the input data. In this particular example, a number of convolutional layers and pooling layers are used to perform this function.

In the example shown in FIG. 3, a convolutional layer 302 receives the initial input data and applies a convolution operation to the input data. In some embodiments, the convolutional layer 302 represents a 224×224×64 convolutional layer that operates using a 3×3 kernel size. A pooling layer 304 receives and combines the outputs of the convolutional layer 302, such as by using maximum pooling. A convolutional layer 306 receives the outputs of the pooling layer 304 and applies a convolution operation to that data. In some embodiments, the convolutional layer 306 represents a 112×112×128 convolutional layer that operates using a 3×3 kernel size. A pooling layer 308 receives and combines the outputs of the convolutional layer 306, such as by using maximum pooling. A convolutional layer 310 receives the outputs of the pooling layer 308 and applies a convolution operation to that data. In some embodiments, the convolutional layer 310 represents a 56×56×256 convolutional layer that operates using a 3×3 kernel size. A pooling layer 312 receives and combines the outputs of the convolutional layer 310, such as by using maximum pooling. A convolutional layer 314 receives the outputs of the pooling layer 312 and applies a convolution operation to that data. In some embodiments, the convolutional layer 314 represents a 28×28×512 convolutional layer that operates using a 3×3 kernel size. A pooling layer 316 receives and combines the outputs of the convolutional layer 314, such as by using maximum pooling.

The outputs of the pooling layer 316 represent the identified features of the original input data, such as in a 28×28×512 feature space. Here, it can be seen that the fused front-end feature extractor 206 sequentially reduces the spatial resolution of the data being processed and increases the depth of the feature map being generated. Each of the convolutional layers 302, 306, 310, 314 here generally operates by multiplying a set of weights (represented by the kernels) with their respective inputs. In the context of the multi-task fusion neural network architecture 200, the convolutional layers 302, 306, 310, 314 can use the same weights to process the images 202 or other input data, even though the fused front-end feature extractor 206 is being used in conjunction with multiple image processing tasks or other data processing tasks that are implemented using the pre-processing branches 208a-208d and the post-processing branches 212a-212d. The weights used in the convolutional layers 302, 306, 310, 314 are established during training, which as noted above can involve providing the fused front-end feature extractor 206 with training images or other training data having known features and training the fused front-end feature extractor 206 to properly identify those known features.

Although FIG. 3 illustrates one example of a fused front-end feature extractor 206 in a multi-task fusion neural network architecture 200, various changes may be made to FIG. 3. For example, the fused front-end feature extractor 206 may include any suitable number of convolutional layers, pooling layers, or other layers as needed or desired. Also, any other suitable feature extractor may be used in the multi-task fusion neural network architecture 200.

FIG. 4 illustrates an example back-end fusion layer 210 in a multi-task fusion neural network architecture 200 in accordance with this disclosure. As described above, the back-end fusion layer 210 is used to combine coarse outputs or other initial outputs from at least some of the pre-processing branches 208a-208d for input to at least one of the post-processing branches 212a-212d. Note that the back-end fusion layer 210 shown here may be used with any suitable input data and is not limited to use with image data.

As shown in FIG. 4, the back-end fusion layer 210 receives initial outputs 402 and 404 from two of the pre-processing branches 208a-208d. As noted above, the initial outputs 402 and 404 may represent coarse estimates or other initial information associated with a disparity/depth map, a segmentation mask, a Bokeh image, or an HDR image. Thus, the initial outputs 402 and 404 are associated with two different tasks being performed in the multi-task fusion neural network architecture 200.

The back-end fusion layer 210 in this example is implemented using a concatenation layer 406, which concatenates the initial outputs 402 and 404 together. For example, the initial outputs 402 and 404 may represent vectors, and the concatenation layer 406 may combine the initial outputs 402 and 404 by concatenating the vector for one of the initial outputs 402 and 404 to the vector for the other of the initial outputs 404 and 402. This produces combined initial outputs 408, which in this example may be said to represent two-channel outputs (since the initial outputs from two tasks are being combined).

The combined initial outputs 408 are provided to multiple post-processing branches 212a-212b, which process the combined outputs 408 to perform different tasks. In this example, each of the post-processing branches 212a-212b is illustrated as including various neural network operational layers 410 that implement the functionality of that post-processing branch 212a-212b. While not shown here, the other post-processing branches 212c-212d and the pre-processing branches 208a-208d may be implemented in the same or similar manner in some cases. The operational layers 410 in each post-processing branch 212a-212b support the encoding of the combined outputs 408 to reduce their spatial resolution, followed by decoding of the results to increase their spatial resolution. This can be accomplished using suitably-trained convolutional, deconvolutional, pooling, and other neural network operational layers 410. In particular embodiments, each of the post-processing branches 212a-212b may be implemented using a light-weight UNet structure, although other machine learning structures may also be used.

In this example, each of the post-processing branches 212a-212b encodes and decodes the combined outputs 408 (such as with convolutional, deconvolutional, and pooling layers) to perform different tasks in the multi-task fusion neural network architecture 200. Thus, for example, the weights used in various operational layers 410 of the post-processing branches 212a-212b can be different in order to support the different tasks. Also, feedforward links 412 can be used in the post-processing branches 212a-212b to propagate information between different layers 410 in the post-processing branches 212a-212b. In some embodiments, one or more feedforward links 412 may be used to propagate information between non-adjacent layers 410 in one or more of the post-processing branches 212a-212b.

Outputs 414 generated by each collection of operational layers 410 may be referred to as "residuals" and represent refinements to the initial outputs 402 or 404 being processed using that collection of operational layers 410. Combination functions 416 combine the residual outputs 414 and the original initial outputs 402 and 404 to produce final outputs 418 and 420 for the two post-processing branches 212a-212b.

Because each of the post-processing branches 212a-212b receives combined outputs 408 representing combined initial outputs 402 and 404 for different tasks, the post-processing branches 212a-212b (each of which is associated with a different task) can each operate by taking into account the initial results associated with multiple tasks being performed. This allows the refinements produced by each of the post-processing branches 212a-212b to be based on information associated with multiple tasks being performed in the multi-task fusion neural network architecture 200. As described above, this may be useful for various combinations of tasks and can help to improve the quality of the results produced by those tasks. For instance, depth maps can be used to produce more accurate segmentation masks (or vice versa).

Although FIG. 4 illustrates one example of a back-end fusion layer 210 in a multi-task fusion neural network architecture 200, various changes may be made to FIG. 4. For example, the back-end fusion layer 210 may fuse or otherwise combine initial outputs from more than two pre-processing branches 208a-208d. Also, the back-end fusion layer 210 may provide combined outputs 408 to more than two post-processing branches 212a-212d. Further, the initial outputs that are combined and the post-processing branches that receive the combined outputs can vary based on the specific tasks being performed in the multi-task fusion neural network architecture 200. In addition, the post-processing branches 212a-212d may or may not be implemented as shown in FIG. 4, and different post-processing branches 212a-212d may be implemented using different structures (as may the pre-processing branches 208a-208d).

FIGS. 5A, 5B, 5C, and 5D illustrate an example input image and example processing results that may be obtained using a multi-task fusion neural network architecture 200 in accordance with this disclosure. In this particular example, the multi-task fusion neural network architecture 200 is being used to process image data and to jointly consider both depth and segmentation when generating depth maps and segmentation masks. However, the multi-task fusion neural network architecture 200 may be used to perform any other suitable tasks, whether or not related to image processing.

Figure 5A:
FIGS. 5A, 5B, 5C, and 5D illustrate an example input image and example processing results that may be obtained using a multi-task fusion neural network architecture in accordance with this disclosure.
Figure 5B:
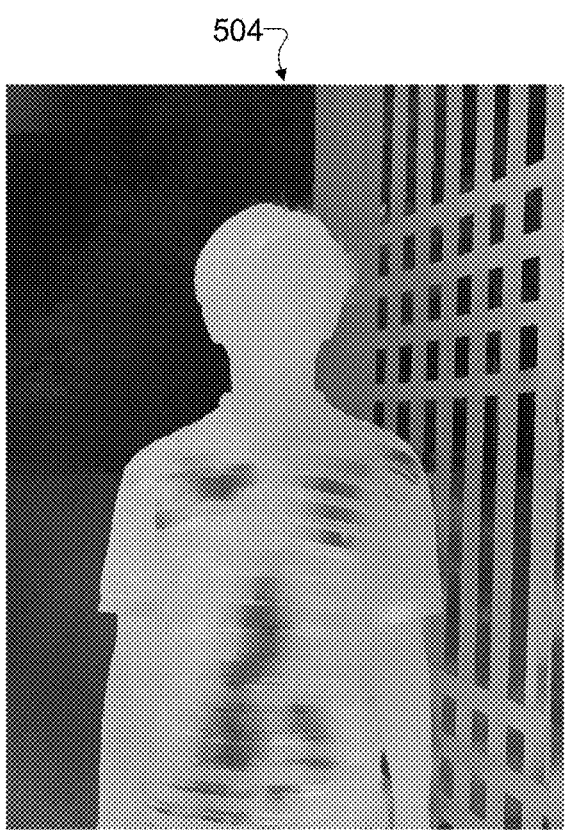
Figure 5C:
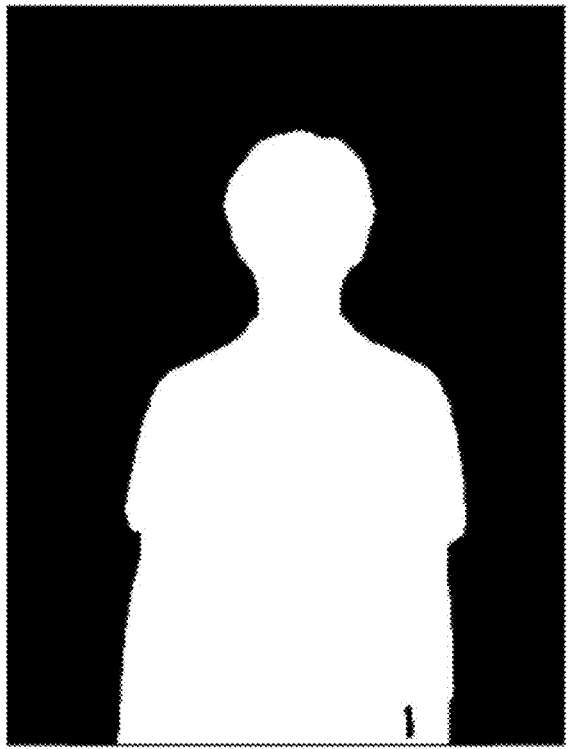

In FIG. 5A, an input image 502 is received and is processed by the multi-task fusion neural network architecture 200. In this example, the image 502 represents an image with a person in the foreground, although the person's face has been obscured for privacy. The person's shirt here includes a particular texture or other pattern that can make automated depth determinations difficult. In FIG. 5B, an initial output 504 represents an output of the pre-processing branch 208a and contains an initial depth map associated with the input image 502. In FIG. 5C, an initial output 506 represents an output of the pre-processing branch 208b and contains an initial segmentation mask associated with the input image 502. As can be seen in FIGS. 5B and 5C, the segmentation mask (output 506) appears to accurately identify the boundaries of the person from the image 502. However, the initial depth map (output 504) does not accurately identify the depths of the pixels associated with the person due to the texture or other pattern of the person's shirt. If the depth map of FIG. 5B is used to perform additional functions, it may result in artifacts or other imaging errors.

Figure 5D:
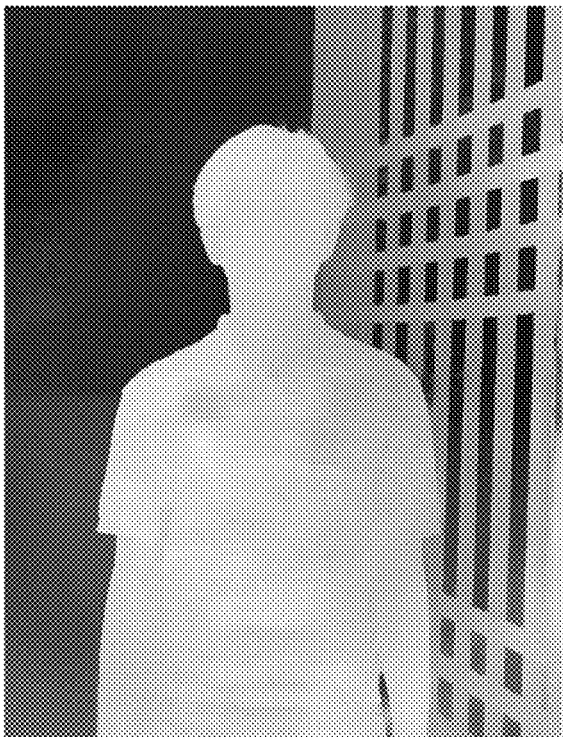

In FIG. 5D, a final output 508 of the post-processing branch 212a is shown, where the final output 508 contains a final depth map associated with the input image 502. As can be seen in FIG. 5D, the final depth map (output 508) is much more accurate in identifying the depths of the pixels associated with the person, even with the presence of the texture or other pattern of the person's shirt. This is because the post-processing branch 212a here receives both the initial depth map and the initial segmentation mask and considers both when generating the final depth map. As a result, the post-processing branch 212a can determine, based on the initial segmentation mask, that the initial depth map is incorrectly identifying different depths for the same object in the scene. With this knowledge, the post-processing branch 212a can generate a more accurate final depth map.

Although FIGS. 5A, 5B, 5C, and 5D illustrate examples of an input image and processing results that may be obtained using a multi-task fusion neural network architecture 200, various changes may be made to these figures. For example, these figures are merely meant to illustrate one example of the type of results that could be obtained using the approaches described in this disclosure. Obviously, images of scenes can vary widely, and the results obtained using the approaches described in this patent document can also vary widely depending on the circumstances. Also, this particular example shows how initial segmentation mask results can be used to generate final depth mask results, but initial and final results for other suitable combinations of tasks may be used in the multi-task fusion neural network architecture 200.

Figure 6:
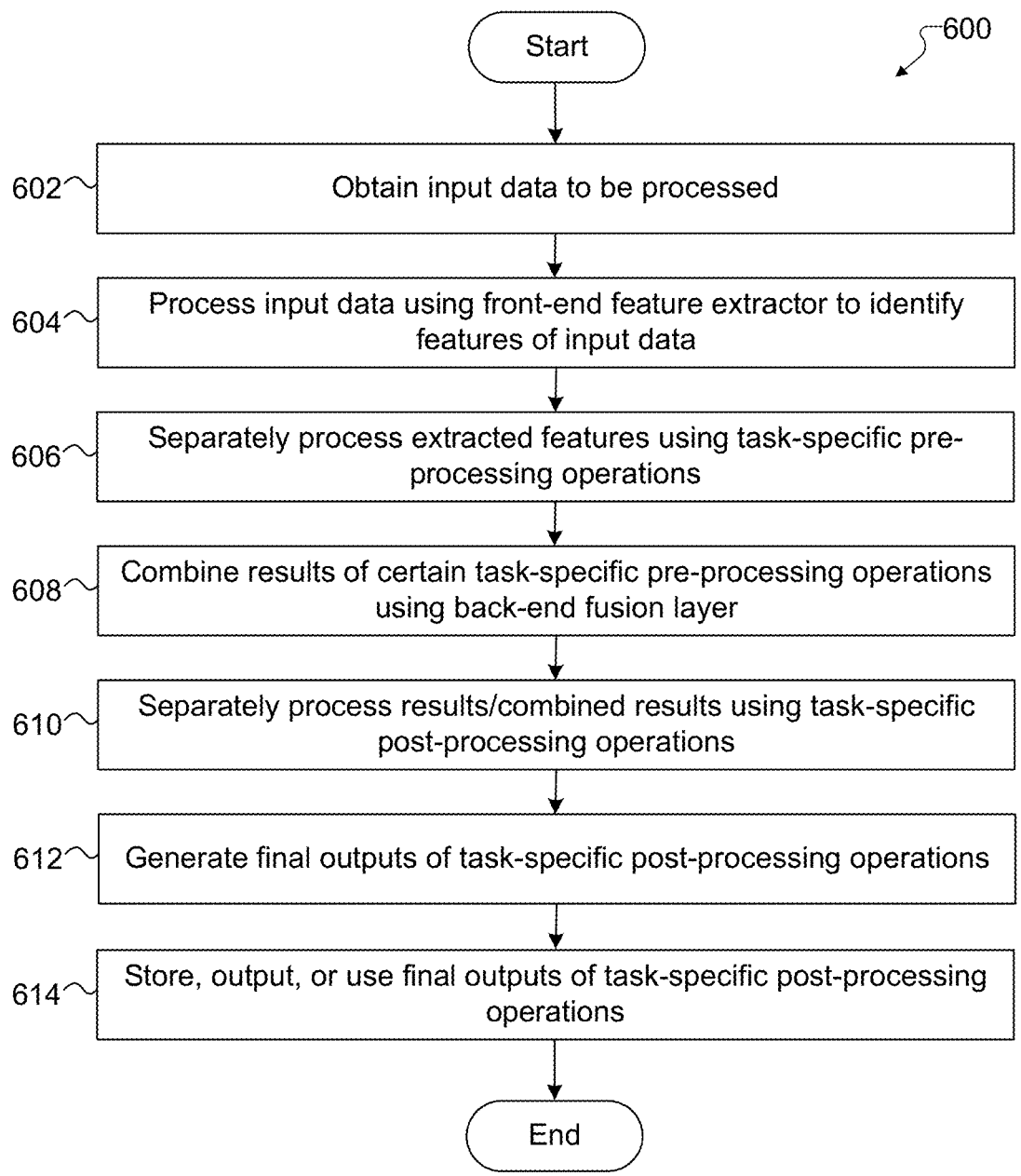
FIG. 6 illustrates an example method for using a multi-task fusion neural network architecture in accordance with this disclosure.

FIG. 6 illustrates an example method 600 for using a multi-task fusion neural network architecture in accordance with this disclosure. For ease of explanation, the method 600 of FIG. 6 is described as involving the use of the multi-task fusion neural network architecture 200 of FIG. 2 in the network configuration 100 of FIG. 1. However, the method 600 may involve the use of any suitable multi-task fusion neural network architecture designed in accordance with this disclosure, and the multi-task fusion neural network architecture may be used with any suitable device(s) and in any suitable system(s).

As shown in FIG. 6, input data to be processed is received at step 602. This may include, for example, the multi-task fusion neural network architecture 200 receiving one or more input images 202, such as from one or more cameras or other imaging sensors 180. Note that the multi-task fusion neural network architecture 200 may be implemented in an end-user device (such as an electronic device 101, 102, 104) and process data collected or generated by that end-user device, or the multi-task fusion neural network architecture 200 may be implemented in one device (such as a server 106) and process data collected or generated by another device (such as an electronic device 101, 102, 104).

The input data is processed using a front-end feature extractor to identify features of the input data at step 604. This may include, for example, the fused front-end feature extractor 206 of the multi-task fusion neural network architecture 200 processing the image(s) 202 or other input data to identify various features of the image(s) 202 or other input data. As a particular example, this may include various convolutional, pooling, and other operational layers 302-316 processing the image(s) 202 or other input data to identify the features of the input data in a defined feature space. Since a common fused front-end feature extractor 206 is used here, the weights of the fused front-end feature extractor 206 are the same regardless of the tasks to be performed using the input data.

The extracted features are separately processed using task-specific pre-processing operations at step 606. This may include, for example, different pre-processing branches 208a-208d associated with different tasks receiving the extracted features from the fused front-end feature extractor 206. This may also include convolution neural network layers and other operational layers of the pre-processing branches 208a-208d generating different coarse outputs or other initial tasks outputs based on their respective functions. For instance, the pre-processing branch 208a may generate an initial disparity or depth map, the pre-processing branch 208b may generate an initial segmentation mask, the pre-processing branch 208c may generate an initial Bokeh image, and the pre-processing branch 208d may generate an initial HDR image. In some embodiments, the different pre-processing branches 208a-208d may operate concurrently.

The results of at least some of the task-specific pre-processing operations are combined using a back-end fusion layer at step 608. This may include, for example, the back-end fusion layer 210 combining initial outputs from two or more of the pre-processing branches 208a-208d. Note that the back-end fusion layer 210 may combine the initial outputs from two or more of the pre-processing branches 208a-208d in one way or in multiple ways. The exact combination or combinations of the initial outputs from the pre-processing branches 208a-208d that are combined can vary based on the different ways in which the outputs can be jointly processed. In some embodiments, this may include the back-end fusion layer 210 using one or more concatenation layers 406 to concatenate at least one combination of initial outputs from the pre-processing branches 208a-208d.

The combined results (and possibly some of the results without combination) are separately processed using task-specific post-processing operations at step 610, and final outputs of the task-specific post-processing operations are generated at step 612. This may include, for example, different post-processing branches 212a-212d associated with different tasks receiving the initial outputs and/or the combined initial outputs from the back-end fusion layer 210. This may also include convolution neural network layers and other operational layers of the post-processing branches 212a-212d generating different final outputs 204a-204d based on their respective functions. For instance, the post-processing branch 212a may generate a final disparity or depth map, the post-processing branch 212b may generate a final segmentation mask, the post-processing branch 212c may generate a final Bokeh image, and the post-processing branch 212d may generate a final HDR image. Again, note that each individual post-processing branch 212a-212d may or may not receive and process combined initial outputs from the back-end fusion layer 210. For instance, a post-processing branch 212a-212d may receive and process the initial outputs from only one of the pre-processing branches 208a-208d. This may occur, for example, if that post-processing branch 212a-212d has little or no benefit in considering fused outputs from multiple pre-processing branches 208a-208d. If processing initial outputs from only one pre-processing branch 208a-208d, the initial outputs may or may not be received via the back-end fusion layer 210. In some embodiments, the different post-processing branches 212a-212d may operate concurrently.

The final outputs are stored, output, or used in some manner at step 614. This may include, for example, the electronic device 101, 102, 104 or the server 106 using the disparity/depth map 204a and/or the segmentation mask 204b to perform desired image processing of one or more images. This may also include the electronic device 101, 102, 104 or the server 106 outputting the Bokeh image 204c and/or the HDR image 204d to a user or saving the Bokeh image 204c and/or the HDR image 204d to a camera roll stored in a memory 130 of the electronic device 101, 102, 104 or the server 106. This could further include the electronic device 101, 102, 104 or the server 106 attaching the Bokeh image 204c and/or the HDR image 204d to a text message, email, or other communication to be transmitted. Of course, the final outputs of the multi-task fusion neural network architecture 200 could be used in any other or additional manner.

Although FIG. 6 illustrates one example of a method 600 for using a multi-task fusion neural network architecture 200, various changes may be made to FIG. 6. For example, while shown as a series of steps, various steps in FIG. 6 may overlap, occur in parallel, or occur any number of times. Also, the method 600 may process any suitable input data and is not limited to use with image processing tasks.

Although this disclosure has been described with example embodiments, various changes and modifications may be suggested to one skilled in the art. It is intended that this disclosure encompass such changes and modifications as fall within the scope of the appended claims.

What is claimed is:

1. A method comprising:
identifying, by at least one processor, multiple features of input data using a common feature extractor;
processing, by the at least one processor, at least some of the identified features of the input data using each of multiple pre-processing branches, each pre-processing branch comprising a first set of neural network layers and generating initial outputs associated with a different one of multiple data processing tasks;
combining, by the at least one processor, at least two of the initial outputs from at least two of the pre-processing branches to produce combined initial outputs; and
processing, by the at least one processor, at least some of the initial outputs or at least some of the combined initial outputs using each of multiple post-processing branches, each post-processing branch comprising a second set of neural network layers and generating final outputs associated with a different one of the multiple data processing tasks.

2. The method of claim 1, wherein:
at least one of the post-processing branches uses at least some of the combined initial outputs to generate the final outputs associated with at least one of the data processing tasks; and
at least one other of the post-processing branches uses at least some of the initial outputs to generate the final outputs associated with at least one other of the data processing tasks.

3. The method of claim 1, wherein:
the common feature extractor comprises a third set of neural network layers that identify the features of the input data based on multiple weights; and
the same weights are used to identify the features of the input data for all of the data processing tasks.

4. The method of claim 1, wherein combining the at least two of the initial outputs to produce the combined initial outputs comprises using a fusion layer that:
concatenates the at least two of the initial outputs from at least two of the pre-processing branches together to produce the combined initial outputs; and
provides the combined initial outputs to at least one of the post-processing branches.

5. The method of claim 1, wherein:
at least three pre-processing branches generate the initial outputs associated with at least three corresponding data processing tasks; and
at least three post-processing branches generate the final outputs associated with the at least three corresponding data processing tasks.

6. The method of claim 1, wherein:
the input data comprises one or more input images; and
the data processing tasks comprise at least two of: generation of a disparity or depth map, generation of a segmentation mask, generation of a Bokeh image, and generation of a high dynamic range (HDR) image.

7. The method of claim 6, wherein:
the combined initial outputs comprise a combination of an initial depth map and an initial segmentation mask; and
one of the post-processing branches generates a final depth map using the combination of the initial depth map and the initial segmentation mask.

8. An electronic device comprising:
at least one memory; and
at least one processor operatively coupled to the at least one memory and configured to:
  identify multiple features of input data using a common feature extractor;
  process at least some of the identified features of the input data using each of multiple pre-processing branches, each pre-processing branch comprising a first set of neural network layers and configured to generate initial outputs associated with a different one of multiple data processing tasks;
  combine at least two of the initial outputs from at least two of the pre-processing branches to produce combined initial outputs; and
  process at least some of the initial outputs or at least some of the combined initial outputs using each of multiple post-processing branches, each post-processing branch comprising a second set of neural network layers and configured to generate final outputs associated with a different one of the multiple data processing tasks.

9. The electronic device of claim 8, wherein:
at least one of the post-processing branches is configured to use at least some of the combined initial outputs to generate the final outputs associated with at least one of the data processing tasks; and
at least one other of the post-processing branches is configured to use at least some of the initial outputs to generate the final outputs associated with at least one other of the data processing tasks.

10. The electronic device of claim 8, wherein:
the common feature extractor comprises a third set of neural network layers configured to identify the features of the input data based on multiple weights; and
the third set of neural network layers is configured to use the same weights to identify the features of the input data for all of the data processing tasks.

11. The electronic device of claim 8, wherein:
the at least one processor is configured to use a fusion layer to combine the at least two of the initial outputs and produce the combined initial outputs; and
the fusion layer is configured to:
  concatenate the at least two of the initial outputs from at least two of the pre-processing branches together to produce the combined initial outputs; and
  provide the combined initial outputs to at least one of the post-processing branches.

12. The electronic device of claim 8, wherein:
at least three pre-processing branches are configured to generate the initial outputs associated with at least three corresponding data processing tasks; and
at least three post-processing branches are configured to generate the final outputs associated with the at least three corresponding data processing tasks.

13. The electronic device of claim 8, wherein:
the input data comprises one or more input images; and
the data processing tasks comprise at least two of: generation of a disparity or depth map, generation of a segmentation mask, generation of a Bokeh image, and generation of a high dynamic range (HDR) image.

14. The electronic device of claim 13, wherein:
the combined initial outputs comprise a combination of an initial depth map and an initial segmentation mask; and
one of the post-processing branches is configured to generate a final depth map using the combination of the initial depth map and the initial segmentation mask.

15. A non-transitory machine-readable medium containing instructions that when executed cause at least one processor of an electronic device to:
  identify multiple features of input data using a common feature extractor;
  process at least some of the identified features of the input data using each of multiple pre-processing branches, each pre-processing branch comprising a first set of neural network layers and configured to generate initial outputs associated with a different one of multiple data processing tasks;
  combine at least two of the initial outputs from at least two of the pre-processing branches to produce combined initial outputs; and
  process at least some of the initial outputs or at least some of the combined initial outputs using each of multiple post-processing branches, each post-processing branch comprising a second set of neural network layers and configured to generate final outputs associated with a different one of the multiple data processing tasks.

16. The non-transitory machine-readable medium of claim 15, wherein:
at least one of the post-processing branches is configured to use at least some of the combined initial outputs to generate the final outputs associated with at least one of the data processing tasks; and
at least one other of the post-processing branches is configured to use at least some of the initial outputs to generate the final outputs associated with at least one other of the data processing tasks.

17. The non-transitory machine-readable medium of claim 15, wherein:
the common feature extractor comprises a third set of neural network layers configured to identify the features of the input data based on multiple weights; and
the third set of neural network layers is configured to use the same weights to identify the features of the input data for all of the data processing tasks.

18. The non-transitory machine-readable medium of claim 15, wherein the instructions that when executed cause the at least one processor to combine the at least two of the initial outputs and produce the combined initial outputs comprise:
  instructions that when executed cause the at least one processor to use a fusion layer that is configured to:
    concatenate the at least two of the initial outputs from at least two of the pre-processing branches together to produce the combined initial outputs; and
    provide the combined initial outputs to at least one of the post-processing branches.

19. The non-transitory machine-readable medium of claim 15, wherein:
at least three pre-processing branches are configured to generate the initial outputs associated with at least three corresponding data processing tasks; and
at least three post-processing branches are configured to generate the final outputs associated with the at least three corresponding data processing tasks.

20. The non-transitory machine-readable medium of claim 15, wherein:
  the input data comprises one or more input images; and
  the data processing tasks comprise at least two of: generation of a disparity or depth map, generation of a segmentation mask, generation of a Bokeh image, and generation of a high dynamic range (HDR) image.

* * * * *